United States Patent
Harris et al.

(10) Patent No.: US 7,820,253 B2
(45) Date of Patent: Oct. 26, 2010

(54) POLY(ARYLETHERIMIDES) FOR NEGATIVE BIREFRINGENT FILMS FOR LCDS

(75) Inventors: Frank Harris, Boca Raton, FL (US); Limin Sun, Copley, OH (US); Dong Zhang, Uniontown, OH (US); Stephen Z. D. Cheng, Richfield, OH (US)

(73) Assignee: Akron Polymer Systems, Akron, OH (US)

( * ) Notice: Subject to any disclaimer, the term of this patent is extended or adjusted under 35 U.S.C. 154(b) by 360 days.

(21) Appl. No.: 11/867,372

(22) Filed: Oct. 4, 2007

(65) Prior Publication Data

US 2009/0197019 A1      Aug. 6, 2009

Related U.S. Application Data

(63) Continuation of application No. 11/488,929, filed on Jul. 18, 2006, now Pat. No. 7,438,957.

(51) Int. Cl.
*G02F 1/13363* (2006.01)
(52) U.S. Cl. ............... 428/1.3; 428/473.5; 349/120; 528/353
(58) Field of Classification Search ............... 428/1.27, 428/1.3, 473.5; 528/172–173, 176, 185, 528/188, 220, 229, 350, 353; 349/120
See application file for complete search history.

(56) References Cited

U.S. PATENT DOCUMENTS

| | | | | |
|---|---|---|---|---|
| 5,089,593 A | * | 2/1992 | Fjare et al. | 528/188 |
| 5,321,096 A | * | 6/1994 | Okawa et al. | 525/420 |
| 5,344,916 A | * | 9/1994 | Harris et al. | 528/353 |
| 5,480,964 A | | 1/1996 | Harris | |
| 5,580,950 A | | 12/1996 | Harris | |
| 6,074,709 A | | 6/2000 | Ezzell | |
| 6,133,407 A | * | 10/2000 | Kaneshiro et al. | 528/353 |
| 6,853,424 B2 | | 2/2005 | Elman | |
| 7,438,957 B2 | * | 10/2008 | Harris et al. | 428/1.3 |

FOREIGN PATENT DOCUMENTS

JP   3735361 B2   1/2006

* cited by examiner

*Primary Examiner*—Sophie Hon
(74) *Attorney, Agent, or Firm*—George W. Moxon, II; Moxon and Associates, LLC

(57) ABSTRACT

A negative birefringence film prepared from a poly(aryletherimide) which is the reaction product of a dianhydride and a diamine, where the dianhydride is 4,4'-[4,4'-(p-phenyleneoxy)isopropylidene]bis(phthalic anhydride) (BisADA), bis(3,4-dicarboxyphenyl)ether dianhydride (ODPA), 4,4'-bis(3,4-dicarboxyphenoxy)biphenyl dianhydride (BPEDA), 1,4-bis(3,4-dicarboxyphenyloxy)phenyl dianhydride (BPQDA), 3,3',4,4'-tetracarboxylicbiphenyl dianhydride (BPDA), or 2,2-bis(3,4-dicarboxyphenyl)-1,1,1,3,3,3-hexafluoropropane dianhydride (6FDA), alone or a mixture with one or more of:
3,3',4,4'-tetracarboxylicbiphenyl dianhydride (BPDA), 2,2-bis(3,4-dicarboxyphenyl)-1,1,1,3,3,3-hexafluoropropane dianhydride (6FDA); and where the diamine is 1,4-bis(2-trifluoromethyl-4-aminophenoxy)-2,5-di(t-butyl)benzene (BTBDA), 3,3'-dimethyl-4,4'-diamino biphenyl (OTOL), or mixtures thereof and wherein when a mixture of dianhydrides is present, they are present in a molar amount of between 99 to 1 (99:1) and 1 to 99 (1:99), and the film has a negative birefringence greater than 0.01, at a thickness of less than 15 µm, when the poly(aryletherimide) is solution cast or coated onto a substrate.

16 Claims, No Drawings

POLY(ARYLETHERIMIDES) FOR NEGATIVE BIREFRINGENT FILMS FOR LCDS

RELATED APPLICATION DATA

This application claims priority to previously filed U.S. Provisional Application No. 60/700,169, filed on Jul. 18, 2005 entitled "Poly(aryletherimides) for Negative Birefringent Films for LCDs" and U.S. patent application Ser. No. 11/488,929, filed on Jul. 18, 2006, now U.S. Pat. No. 7,438,957, issued on Oct. 21, 2008, both of which are hereby incorporated by reference in their entirety.

FIELD OF THE INVENTION

The invention relates to the manufacture of negative birefringent polymer films for use in compensation layers in liquid crystal displays (LCDs). More particularly, the invention relates to the manufacture and use of poly(aryletherimides) (PAEIs), which are prepared from dianhydrides containing flexible ether linkages, and preferably low-cost, fluorine-containing, aromatic ether diamines, and aromatic diamines containing flexible ether linkages. The PAEIs are soluble in variety of organic solvents including aromatic solvents and can coated on a variety of polymer substrates to produce multi-layer polymeric optical films.

BACKGROUND OF THE INVENTION

Liquid crystals are useful for electronic displays because light traveling through a thin film of liquid crystal is affected by the birefringence of the film, which can be controlled by the application of a voltage across the film. Liquid crystal displays (LCDs) are desirable because the transmission or reflection of light from an external source, including ambient light, can be controlled with much less power than is required for luminescent materials used in other displays.

The following terms have the definitions as stated below.
1. Optical axis herein refers to the direction in which propagating light does not see birefringence.
2. Negative C-plate herein refers to the plate in which the optical axis is perpendicular to the plate.
3. In-plane refractive indices is defined by $n_i=(n_x+n_y)/2$, where $n_x$, and $n_y$ are refractive indices in the direction of x and y, and x-y plane is parallel to the film plane.
4. In-plane birefringence is defined by $\Delta n_i=(n_x-n_y)$.
5. In-plane phase retardation is defined by $R_i=(n_x-n_y)d$, where d is a thickness of the film in a perpendicular to x-y plane z direction.
6. Out of-plane birefringence is defined by $\Delta n\perp=n_z-(n_x+n_y)/2$, where $n_z$ refractive index is in z direction.
7. Out of-plane retardation is defined by $R\perp=[n_z-(n_x+n_y)/2]d$.

LCDs now are commonly used in such applications as digital watches, calculators, cell phones, portable computers, televisions, and many other types of electronic equipment where the need exists for long life and small room operation with low power consumption. In particular, portable computer and large screen television LCDs benefit from their light-weight, small room occupation, low power consumption, and long life operation. It is expected that LCDs will replace cathode ray tubes (CRT) as monitors and television screens in the near future.

However, there is intrinsic viewing angle dependence in LCDs, which affects the quality of the display performance, such as contrast, coloration, and/or brightness. The primary factor limiting the quality of an LCDs' performance is the propensity of the light to leak through liquid crystal elements or cell, and this leakage's dependence on the direction from which the display is viewed. The best quality LCD picture is observed only within a narrow viewing angle range centered perpendicular to the display screen.

One of common methods to widen LCDs' viewing angles is to apply compensation films. Several LCD modes, including Twisted Nematic (TN), Super Twisted Nematic (STN), Vertical Alignment (VA), and Optically Compensated Bend (OCB), with or without an applied field, show positive C-plate symmetry, which can be compensated for by a compensation film with negative C-plate symmetry.

In a compensation film with negative C-plate symmetry, the out-of-plane refractive index, $n_\perp$ or $n_z$, is less than the in-plane refractive index, $n_i=(n_x+n_y)/2$, resulting in a negative out-of-plane birefringence, $\Delta n_\perp=n_z-(n_x+n_y)/2<0$ and, hence, a negative out-of-plane retardation, $R_\perp=[n_z-(n_x+n_y)/2]d<0$. Negative birefringent films have been prepared by several different methods, such as, but not limited to precision stretching of polymer films, precisely controlled vapor deposition of thin ceramic layers, mixing of a swellable inorganic clay layer in a crosslinked polymer matrix, and solution casting or coating of thin polymer films. For large size negative birefringent films, the solution casting or coating method is preferred due to ease of processing and enhanced performance. A currently used technology involves stretching the film. The drawback to utilizing a stretching of these films involves the resultant stress relaxation which can distort the film, namely at a film/screen's corners. Using a poly(aryletherimide) of this invention eliminates the need for stretching because the required negative birefringence is attained during the film casting or coating process.

There are two major ways to apply a negative birefringent film prepared with the casting or coating method onto an LCD component that is an integral part of the LCD device, such as a polarizer. In the first, the negative birefringent film is solution cast on a solvent-passive carrier substrate, adhesive is then applied to the negative birefringent film surface. The combination is laminated on the LCD component and then the carrier substrate is removed (peeled off). In the second case, the negative birefringent film is made by coating the polymer solution directly on a LCD unit component such as a polarizer or a polarizer substrate. This procedure is preferred due to its simplicity and cost saving. However, this procedure requires that the polymer be soluble in select solvents. The solvent must dissolve the polymer which forms the negative birefringent film, but not dissolve or significantly swell the LCD component. The solvent must also be able to be used in large-scale, commercial coating operations. In Japanese patent 3735361, methylisobutyl ketone (MIBK) is shown to be the preferred solvent for solution coating cellulosic substrates since it best meets the above requirements. MIBK also does not dissolve triacetylcellulose (TAC), a commonly used substrate. Ketone solvents such as MIBK are often mixed with other solvents to improve the coating process. Aromatic solvents, in particular, toluene, are also preferred as they do not dissolve TAC.

Prior art has shown that in order to form a negative birefringent film using solution casting or coating procedures, rigid structural units must be incorporated in the polymer backbone. This is thought to be due to such groups promoting the in-plane orientation of the polymer backbones during the solution casting or coating process. Since the incorporation of rigid groups in a polymer backbone also usually results in a reduction in solubility, special steps must be taken to achieve the desired balance between chain rigidity and solubility. For examples, in U.S. Pat. Nos. 5,580,950, and 5,480,964, rigid-rod aromatic polymers, including polyesters, polyamides, and polyimides based on monomers with twisted 2,2'-disubstituted biphenyl structures are utilized. The balance between solubility and backbone rigidity is achieved due to the incorporation of the rigid twisted units in the polymer backbones. The twists in the rigid biphenyl unit hinder chain packing and, thus, enhance solubility.

In U.S. Pat. No. 6,074,709, pendent fluorene groups are incorporated in aromatic polyimide backbones through the polymerization of 9,9-bis(4-aminophenyl)fluorenes in order to attain solubility in useful solvents. However, in order to attain films with negative birefringences>0.01, very rigid dianhydrides, such as 3,3',4,4'-benzophenonetetracarboxylic acid dianhydride (BTDA), 3,3',4,4'-tetracarboxylicbiphenyl dianhydride (BPDA) or pyromellitic dianhydride (PMDA), must be used to prepare the polyimide. The use of flexible dianhydrides such as 4,4'-oxydiphthalic anhydride (ODPA) and 2,2-bis(3,4-dicarboxyphenyl)-1,1,1,3,3,3-hexafluoropropane dianhydride (6FDA) result in polyimides that form films with negative birefringences<0.01.

In U.S. Pat. No. 6,853,424 compensator layers are achieved by incorporation of rigid 1,4-dioxophenylene units

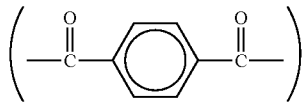

in the form of terephthalates. A particularly useful solubilizing monomer is 4,4'-(hexahydro-4,7-methanoindan-5-ylidene)bisphenol, which provides pendent bulky norbornene groups along the polymer backbone that hinder chain packing and enhance solubility, while still maintaining chain rigidity. Solubility can also be enhanced by copolymerization with monomers containing more flexible units such as 1,3-dioxophenylene groups or hexafluoroisopropylidene linkages. Although the use of the flexiblizing comonomer containing hexafluoroisopropylidine linkages (4,4-hexafluoroisopropylidene diphenol) provides suitable solubility, films of poly (terephthalates) prepared with this monomer have negative birefringences of <0.01. Other more rigid comonomers such as 4,4'-(hexahydro-4,7-melhanoindan-5-ylidene)bisphenol must also be used to attain a polyester chain rigid enough to form films with negative birefringences>0.01. Although more rigid than other polyesters, they are not as rigid as polyimides.

SUMMARY OF THE INVENTION

The present invention is directed to a negative birefringence film prepared from a poly(aryletherimide), the film having a negative birefringence greater than 0.01, preferably greater than 0.03, at a thickness of less than 15 μm, in which the poly(aryletherimide) is solution cast or coated onto a substrate, such as triacetylcellulose, using aromatic solvents and/or ketones or mixtures of these with other compatible solvents. The polymers can be used to form single or multilayers polymeric films. The negative birefringence films can be used as compensation films or coatings in liquid crystal displays.

The negative birefringence films are prepared from a poly (aryletherimide) which is the reaction product of a dianhydride and a diamine, where the dianhydride is 4,4'-[4,4'-(p-phenyleneoxy)isopropylidene]bis(phthalic anhydride) (BisADA), bis(3,4-dicarboxyphenyl)ether dianhydride (ODPA), 4,4'-bis(3,4-dicarboxyphenoxy)biphenyl dianhydride (BPEDA), 1,4-bis(3,4-dicarboxyphenyloxy)phenyl dianhydride (BPQDA), 3,3',4,4'-tetracarboxylicbiphenyl dianhydride (BPDA), or 2,2-bis(3,4-dicarboxyphenyl)-1,1,1,3,3,3-hexafluoropropane dianhydride (6FDA), alone or a mixture with one or more of: 3,3',4,4'-tetracarboxylicbiphenyl dianhydride (BPDA), 2,2-bis(3,4-dicarboxyphenyl)-1,1,1,3,3,3-hexafluoropropane dianhydride (6FDA), 4,4'-[4,4'-(p-phenyleneoxy)isopropylidene]bis(phthalic anhydride) (BisADA), 4,4'-[4,4'-(p-phenyleneoxy)hexafluoroisopropylidene]bis(phthalic anhydride) (Bis-AF-DA), 1,4-bis(3,4-dicarboxyphenoxy)phenyl dianhydride (BPQDA), and 4,4'-bis(3,4-dicarboxyphenoxy)biphenyl dianhydride (BPEDA), and bis(3,4-dicarboxyphenyl)ether dianhydride (ODPA); and where the diamine is 4,4'-diaminophenyl ether, 2-trifluoromethyl-4,4'-diaminophenyl ether, 2-trifluoromethyl -2'-methyl-4,4'diaminophenyl ether, 1,4-bis(4-aminophenoxy)benzene, 4,4'-bis(4-aminophenoxy)biphenyl, 4,4'-bis(3-aminophenoxy)biphenyl, 4,4'-bis(4-aminophenoxy)terphenyl, 4,4'-bis(3-aminophenoxy)terphenyl, 2,2-bis[4-(4-aminophenoxy)phenyl]propane, 2,2-bis[4-(4-aminophenoxy)phenyl]1,1,1,3,3,3-hexafluoropropane, 1,4-bis(4-amino-2-trifluoromethylphenoxy)benzene, 2,2'-bis(trifluoromethyl)-4,4'-diaminophenyl ether (6FODA), 4,4'-bis(4-amino-2-trifluoromethylphenoxy)biphenyl (6FOBDA), 4,4'-bis(4-amino-2-trifluoromethylphenoxy)-3,3',5,5'-tetramethylbiphenyl, 4,4'-bis(4-amino-2-trifluoromethylphenoxy)-3,3',5,5'-tetra(tert-butyl)biphenyl, 4,4'-bis(3-amino-trifluoromethylphenoxy) biphenyl, 4,4"-bis(4-amino-2-trifluoromethylphenoxy)terphenyl, 2,2-bis[4-(4-amino-2-trifluoromethylphenoxy)-phenyl]propane, 2,2-bis[4-(4-amino-2-trifluoromethylphenoxy)-phenyl]1,1,1,3,3,3-hexafluoropropane, 1,4-bis(2-trifluoromethyl-4-aminophenoxy)-2,5-di(t-butyl)benzene (BT-BDA), 3,3'-dimethyl-4,4'-diamino biphenyl (OTOL), 1,4-bis (2-trifluoromethyl-4-aminophenoxy)-2-t-butylbenzene, or mixtures thereof, and wherein when a mixture of dianhydrides is present, they are present in a molar amount of between 99 to 1 (99:1) and 1 to 99 (1:99), and the film has a negative birefringence greater than 0.01, at a thickness of less than 15 μm, when the poly(aryletherimide) is solution cast or coated onto a substrate.

DETAILED DESCRIPTION OF THE INVENTION

The present invention is directed to negative birefringence film prepared from a poly(aryletherimide). Colorless poly (aryletherimide) films less than 15 μm thick with negative birefringence greater than 0.01 can be prepared by solution coating or casting procedures using aromatic solvents, ketones and mixtures of these with compatible solvents. These films achieve their birefringence values as cast and need not be subjected to further stretching. These results are unexpected in that the poly(aryletherimides) are prepared from dianhydrides containing flexible ether linkages and diamines containing flexible ether linkages. Neither component need be rigid if this combination of monomers is used.

Representative and illustrative examples of the useful dianhydrides in the invention are:
2,2-bis(3,4-dicarboxyphenyl)-1,1,1,3,3,3-hexafluoropropane dianhydride (6FDA),
4,4'-oxydiphthalic anhydride (ODPA),
3,3',4,4'-tetracarboxylicbiphenyl dianhydride (BPDA)
4,4'-[4,4'-(p-phenyleneoxy)isopropylidene]bis(phthalic anhydride) (BisADA),
4,4'-[4,4'-(p-phenyleneoxy)hexafluoroisopropylidene]bis (phthalic anhydride) (Bis-AF-DA),
1,4-bis(3,4-dicarboxyphenoxy)phenyl dianhydride,
4,4'-bis(3,4-dicarboxyphenoxy)biphenyl dianhydride (BPEDA).

Preferred dianhydrides include:

BPDA:

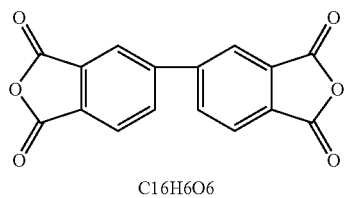

C16H6O6

ODPA:

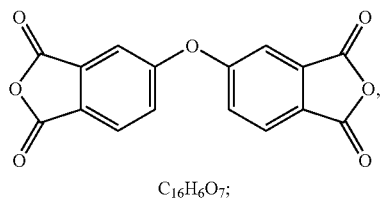

C16H6O7;

BisADA:

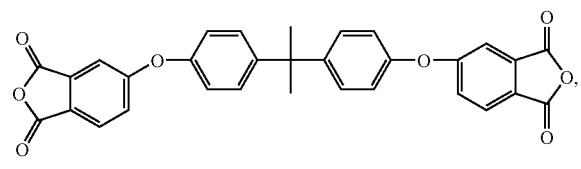

C31H20O8;

6FDA:

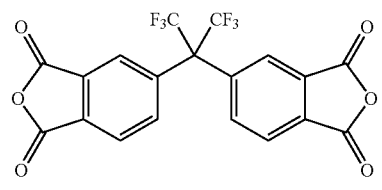

C19H6F6O6

Bis-AF-DA:

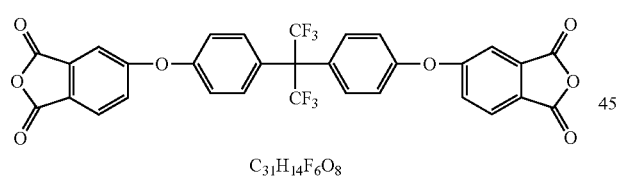

C31H14F6O8

1,4-bis(3,4-dicarboxyphenoxy)phenyl dianhydride:

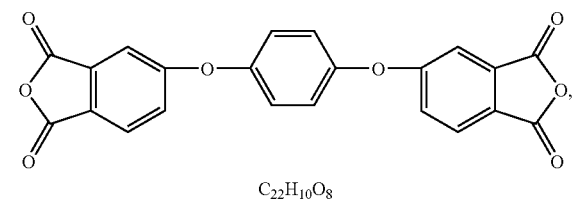

C22H10O8

BPEDA:

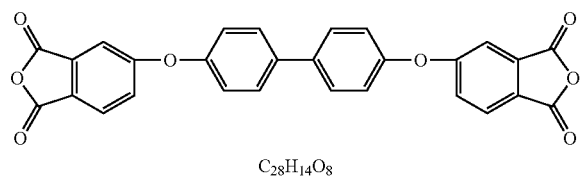

C28H14O8

The diamines that are especially useful for the invention include:
4,4'-diaminophenyl ether,
2-trifluoromethyl-4,4'-diaminophenyl ether,
2,2'-bis(trifluoromethyl)-4,4'-diaminophenyl ether,
2-trifluoromethyl-2'-methyl-4,4'-diaminophenyl ether,
1,4-bis(4-aminophenoxy)benzene,
4,4'-bis(4-aminophenoxy)biphenyl,
4,4'-bis(3-aminophenoxy)biphenyl,
4,4"-bis(4-aminophenoxy)terphenyl,
4,4'-bis(3-aminophenoxy)terphenyl,
2,2-bis[4-(4-aminophenoxy)phenyl]propane,
2,2-bis[4-(4-aminophenoxy)phenyl]1,1,1,3,3,3-hexafluoropropane,
1,4-bis(4-amino-2-trifluoromethylphenoxy)benzene,
4,4'-bis(4-amino-2-trifluoromethylphenoxy)biphenyl,
4,4'-bis(4-amino-2-trifluoromethylphenoxy)-3,3',5,5'-tetramethylbiphenyl,
4,4'-bis(4-amino-2-trifluoromethylphenoxy)-3,3',5,5'-tetra (tert-butyl)biphenyl,
4,4"-bis(4-amino-2-trifluoromethylphenoxy)terphenyl,
2,2-bis[4-(4-amino-2-trifluoromethylphenoxy)phenyl]propane,
2,2-bis[4-(4-amino-2-trifluoromethylphenoxy)phenyl]1,1,1,3,3,3-hexafluoropropane,
1,4-bis[2-trifluoromethyl-4-aminophenoxy]-2-(t-butyl)benzene,
1,4-bis(2-trifluoromethyl-4-aminophenoxy)-2,5-di(t-butyl)benzene (BTBDA),
3,3'-dimethyl-4,4'-diamino biphenyl (OTOL).

Preferred diamines include:
4,4'-bis(4-amino-2-trifluoromethylphenoxy)biphenyl,
4,4'-bis(4-amino-2-trifluoromethylphenoxy)benzene,
2-trifluoromethyl-4,4'-diaminophenyl ether,
2,2'-bis(trifluoromethyl)-4,4'-diaminophenyl ether,
2,2-bis[4-(4-amino-2-trifluoromethylphenoxy)phenyl]1,1,1,3,3,3-hexafluoropropane,
1,4-bis[2-trifluoromethyl-4-aminophenoxy]-2-(t-butyl)benzene
3,3'-dimethyl-4,4'-diaminobiphenyl (OTOL), and
C28H30F6N2O2 or 1,4-bis(2-trifluoromethyl-4-aminophenoxy)-2,5-di(t-butyl)benzene (BTBDA):

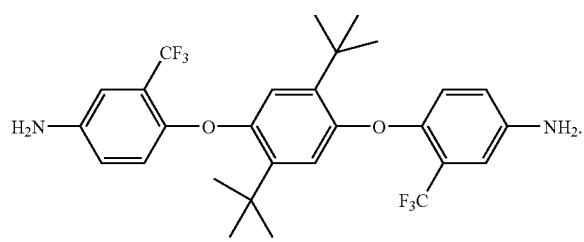

The films of the present invention are soluble in ketones, such as cyclopentanone and MIBK and in aromatic solvents, such as, toluene, chlorobenzene, and o-dichlorobenzene. Solubility of the films in cyclopentanone is appropriate for many applications, a significant number of applications use MIBK or toluene solubility as well. MIBK and toluene are the preferred solvents for solution coating on cellulosic substrates such as TAC. In some cases, it may be preferable to use mixtures of these with other compatible solvents. A mixture of MIBK and ethyl acetate is particularly useful.

In the films of the present invention, the poly(aryletherimide) film will include the trifluoromethyl (perfluoromethyl) groups ($CF_3$) on either the diamine or the dianhydride. Preferably the film will also include a t-butyl group on the diamine or on the dianhydride. The presence of the trifluormethyl group(s) and the t-butyl group(s) enhances the solubility of the film particularly in MIBK or toluene.

Mixtures of dianhydrides and diamines can be employed in the present invention. Mixtures of dianhydrides can be employed, preferably one of the dianhydrides is BPDA, while the other suitable dianhydrides that can be used include pyromellitic anhydride (I):

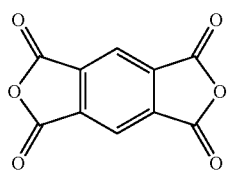

(I)

and aromatic tetracarboxylic acid dianhydrides of formula (II)

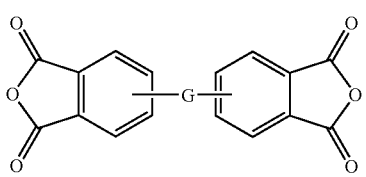

(II)

Mixtures of aromatic diamines can be used, preferable one of the diamine containing aromatic ether linkage and trifluoromethyl, or/and t-butyl substitute, while the other suitable diamines that can be used include:

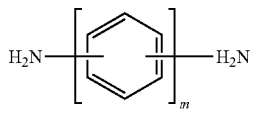

(III)

and/or aromatic diamines of formula (IV)

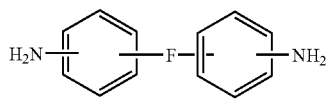

(IV)

where G and F are independently selected from the representative and illustrative group consisting of a covalent bond, a $CH_2$ group, a $C(CH_3)_2$ group, a $C(CF_3)_2$ group, a $C(CX_3)_2$ group wherein X is a halogen, a CO group, a O atom, a S atom, a $SO_2$ group, a $Si(CH_2CH_3)_2$ group or a $N(CH_3)$ group; and m is an integer from 1 to 3.

One embodiment of the present invention is a film prepared from a poly(aryletherimide) containing BisADA residues and BTBDA residues. Such a film can be solution cast from the preferred aromatic and ketone solvents. Such a film displays a negative birefringence>0.01 despite being prepared from a poly(aryletherimide) having repeat units containing multiple ether linkages and a flexible isopropylidene linkage.

EXAMPLES

The invention will be better understood by reference to the following illustrative and non-limiting representative examples, which show the preparation of polyimides and copolyimdes, which are soluble in organic solvents.

Example 1

This example illustrates the general procedure to prepare a homopolyimide of a dianhydride and a diamine in m-cresol.

1.00 millimoles of dianhydride was added to a stirred solution of 1.00 millimoles of a diamine in 10 milliliters of m-cresol under nitrogen at ambient temperature. After the solution was stirred for 6 hours, 0.05 grams of isoquinoline was added. The mixture was heated to 200° C. and maintained at that temperature for 12 hours. During this time, the water of imidization was allowed to distill from the reaction mixture. After the solution was allowed to cool to ambient temperature, it was added slowly to 500 milliliters of stirred methanol. The polymer that precipitated was collected by filtration, washed with ethanol and dried under reduced pressure at 205° C. for 24 hours.

Example 2

This example illustrates the general procedure to prepare a homopolyimide of a dianhydride and 1,4-bis(2-trifluoromethyl-4-aminophenoxy)-2,5-di(t-butyl)benzene (BTBDA) in o-dichlorobenzene (ODCB) or trichlorobenzene (TCB).

1.00 millimoles of dianhydride was added to a stirred solution of 1.00 millimoles of 1,4-bis[(2-trifluoromethyl-4-amino)phenoxy]-2,5,-di(t-butyl)benzene (BTBDA) in 10 milliliters of ODCB or TCB under nitrogen. The mixture was heated to reflux and maintained at that temperature for 12 hours. During this time, the water of imidization was allowed to distill from the reaction mixture. After the solution was allowed to cool to ambient temperature, it was poured to 500 milliliters of stirred methanol. The polymer that precipitated was collected by filtration, washed with ethanol and dried under reduced pressure at 250° C. for 24 hours.

Example 3

This example illustrates the general procedure to prepare a copolyimide from a mixture of dianhydrides and one diamine in m-cresol.

1.00 millimoles of a mixture of dianhydrides was added to a stirred solution of 1.00 millimoles of a diamine in 10 milliliters of m-cresol under nitrogen at ambient temperature. After the solution was stirred for 6 hours, 0.05 grams of isoquinoline was added. The mixture was heated to 200° C. and maintained at that temperature for 12 hours. During this time, the water of imidization was allowed to distill from the reaction mixture. After the solution was allowed to cool to ambient temperature, it was added slowly to 500 milliliters of stirred methanol. The polymer that precipitated was collected by filtration, washed with ethanol and dried under reduced pressure at 150° C. for 24 hours.

Example 4

This example illustrates the general procedure to prepare a copolyimide from a mixture of diamines containing 1,4-bis [(2-trifluoromethyl-4-amino)phenoxy]-2,5,-di(t-butyl)benzene (BTBDA) and a dianhydride in o-dichlorobenzene or trichlorobenzene.

1.00 millimoles of mixture diamine containing 1,4-bis[(2-trifluoromethyl-4-amino)phenoxy]-2,5,-di(t-butyl)benzene (BTBDA) and 1.00 millimoles of 4,4'-[4,4'-(p-phenyleneoxy)isopropylidene]-bis(phthalic anhydride) (Bis-ADA) was added to a stirred solution of in 10 milliliters of ODCB or TCB under nitrogen. The mixture was heated to reflux and maintained at that temperature for 12 hours. During this time, the water of imidization was allowed to distill from the reaction mixture. After the solution was allowed to cool to ambient temperature, it was poured to 500 milliliters of stirred methanol. The polymer that precipitated was collected by filtration, washed with ethanol and dried under reduced pressure at 205° C. for 24 hours.

Example 5

This example illustrates the general procedure to prepare a copolyimide of one dianhydride and multi-components diamines in m-cresol.

1.00 millimoles of a dianhydride was added to a stirred solution of 1.00 millimoles of multi component diamine in 10 milliliters of m-cresol under nitrogen at ambient temperature. After the solution was stirred for 6 hours, 0.05 grams of isoquinoline was added, and the mixture was heat to 200° C. and maintaining at that temperature for 12 hours. During this time, the water of imidization was allowed to distill from the reaction mixture. After the solution was allowed to cool to ambient temperature, it was added slowly to 500 milliliters of stirred methanol. The polymer that precipitated was collected by filtration, washed with ethanol and dried under reduced pressure at 150° C. for 24 hours.

Example 6

This example illustrates the preparation of 1,4-bis[(2-trifluoromethyl-4-amino)phenoxy]-2,5,-di(t-butyl)benzene (BTBDA).
Step 1.

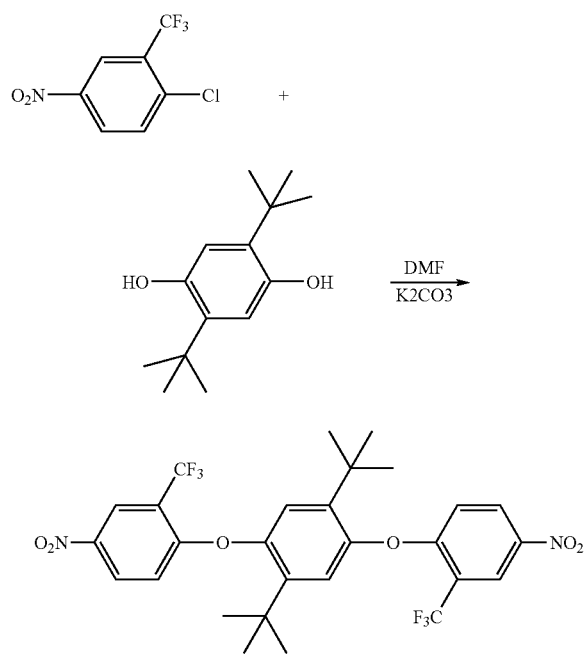

To a 1 L three necked round bottom flask equipped with a magnetic stirrer, a condenser, and a nitrogen inlet were added 2-chloro-5-nitro-benzotrifluoride (92.5 g, 0.41 mole), 2,5-di-tert-butylhydroquinone (42.9 g, 0.2 mole), DMF (500 ml), and potassium carbonate (45.5 g, 0.33 mole). The mixture was heat to 130° C. for 12 hrs. Upon cooling large amount of crystals appeared. The mixture was filtered. The solid obtained was washed with water to eliminate the salts. Recrystallized from DMF afforded fine crystals (85.8 g, yield: 71.5%).
Step 2

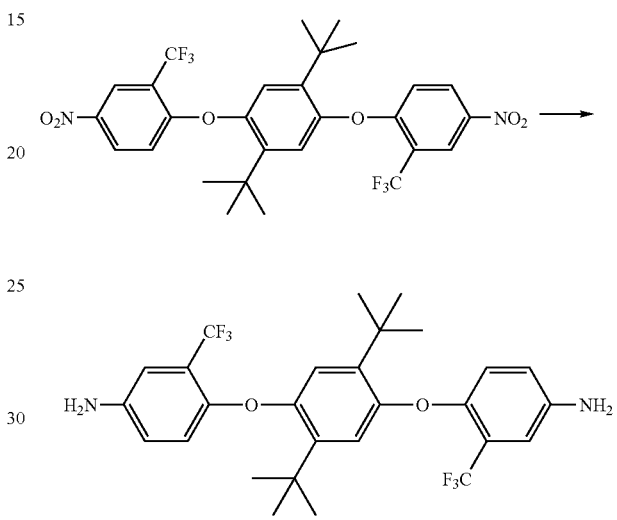

To a 200 ml three necked round bottom flask equipped with a magnetic stirrer, a condenser and a nitrogen inlet were added dinitro-compound (5 g, 8.3 mmol), ethanol (200 ml), Pd/C (10%, 0.3 g). Hydrazine monohydrate (5 ml) was added dropwise. The mixture was heated to reflux for 12 hr. After cooled to room temperature, water was added and white powder precipitated, which was isolated by filtration and dried. This procedure afforded 4.1 g of product (yield: 91%).

Solubility of Polyimides and Birefringence of the Films

Polyimide films displaying negative birefringence were prepared by the following procedure: the polyimide was dissolved in cyclopentanone or MIBK to a solids content between 4~5%. After filtration, the solution was poured on a glass substrate. The solvent was allowed to evaporate at ambient temperature. The glass substrate containing the film was dried at 100° C. under reduced pressure. The polyimide film was removed from the glass by dipping the substrate glass in water. The birefringence of the polyimide film was determined on a Metricon Prism Coupler 2010/M. The birefringences of typical examples are given in Tables 1, 2 and 3.

Film Coating

A MIBK solution of the poly(aryletherimide) was rod-coated on a glass plate or on a triacetylcellulose (TAC) film. In the case of a glass plate, a solution containing 3 to 5 wt % of the poly(aryletherinide) was used, while in the case of a TAC film, a solution containing 8 to 20 wt % of the poly(aryletherimide) was used.

TABLE 1

SOLUBILITY OF 6FDA-BASED POLY(ARYLETHERIMIDES)
IN CYCLOPENTANONE (CPN) AND METHYLISOBUTYL KETONE (MIBK)

| No. | Dianhydride | Diamide | CPN[a] solubility | MIBK[b] solubility | $\Delta n^c_{633}$ | $\Delta n^d_{633}$ |
|---|---|---|---|---|---|---|
| 1 | 6FDA | 4,4'-oxydianiline | Yes[e] | No[f] | −0.0230 | |
| 2 | 6FDA | (CF$_3$-substituted diamine) | Yes | Yes | −0.0256 | −0.0299 |
| 3 | 6FDA | (CF$_3$, CH$_3$-substituted diamine) | Yes | Yes | −0.0169 | −0.0310 |
| 4 | 6FDA | (bis-CF$_3$-substituted diamine) | Yes | Yes | −0.0293 | −0.0295 |
| 5 | 6FDA | (bis-CF$_3$ bis-ether diamine) | Yes | Yes | −0.0195 | −0.0307 |
| 6 | 6FDA | (biphenyl ether diamine) | Yes | No | −0.0397 | |
| 7 | 6FDA | (CF$_3$-substituted biphenyl ether diamine) | Yes | Yes | −0.0306 | −0.0368 |

TABLE 1-continued

SOLUBILITY OF 6FDA-BASED POLY(ARYLETHERIMIDES)
IN CYCLOPENTANONE (CPN) AND METHYLISOBUTYL KETONE (MIBK)

| No. | Dianhydride | Diamide | $CPN^a$ solubility | $MIBK^b$ solubility | $\Delta n^c_{633}$ | $\Delta n^d_{633}$ |
|---|---|---|---|---|---|---|
| 8 | [structure: 6FDA dianhydride with F3C-C-CF3 bridge] | [structure: diamine with CF3 groups and C(CF3)2 bridge, plus second diamine with CF3 and methyl] | Yes | Yes | −0.0137 | |

$^a$Cyclopentanone.
$^b$Methylisobutyl ketone.
$^c$Negative birefringence of 15-20 μm thick film on a glass substrate at 633 nm.
$^d$Negative birefringence of 1-5 μm thick film on a triacetylcellulose (TAC) film at 633 nm.
$^e$Soluble.
$^f$Insoluble.

TABLE 2

SOLUBILITY OF POLY(ARYLETHERIMIDES) BASED
ON SEMI-FLUORINATED DIAMINES IN
CYCLOPENTANONE (CPN) AND METHYLISOBUTYL KETONE (MIBK)

| No. | Dianhydride |
|---|---|
| 9 | [structure: bis(phthalic anhydride) ether] |
| 10 | [structure: bis(phthalic anhydride) ether isomer] |
| 11 | [structure: bis(phthalic anhydride) connected via biphenyl diether] |
| 12 | [structure: biphenyl dianhydride] |
| 13 | [structure: bis(phthalic anhydride) connected via bisphenol-A diether with C(CH3)2 bridge] |

TABLE 2-continued

| No. | Diamine |
|---|---|
| 9 | H₂N–C₆H₃(CF₃)–O–C₆H₃(CF₃)–NH₂ (diphenyl ether with CF₃ groups) |
| 10 | H₂N–C₆H₃(CF₃)–O–C₆H₄–C₆H₄–O–C₆H₃(CF₃)–NH₂ |
| 11 | H₂N–C₆H₃(CF₃)–O–C₆H₄–C₆H₄–O–C₆H₃(CF₃)–NH₂ |
| 12 | H₂N–C₆H₃(CF₃)–O–C₆H₄–C(CF₃)₂–C₆H₄–O–C₆H₃(CF₃)–NH₂ |
| 13 | H₂N–C₆H₃(CF₃)–O–C₆H₄–C₆H₄–O–C₆H₃(CF₃)–NH₂ |

| No. | CPN[a] solubility | MIBK[b] solubility | $\Delta n^c_{633}$ | $\Delta n^d_{633}$ |
|---|---|---|---|---|
| 9 | Yes[e] | No[f] | −0.0289 | |
| 10 | Yes | No | −0.0388 | |
| 11 | Yes | No | −0.0373 | |
| 12 | Yes | No | −0.0383 | |
| 13 | Yes | No | −0.0296 | |

[a]Cyclopentanone.
[b]Methylisobutyl ketone.
[c]Negative birefringence of 15-20 μm thick film on a glass substrate at 633 nm.
[d]Negative birefringence of 1-5 μm thick film on a triacetylcellulose (TAC) film at 633 nm.
[e]Soluble.
[f]Insoluble.

TABLE 3

SOLUBILITY OF 6FDA-BASED POLY(ARYLETHERIMIDE) COPOLYMERS IN CYCLOPENTANONE (CPN) AND METHYLISOBUTYL KETONE (MIBK)

| No. | Dianhydride |
|---|---|
| 14 | 6FDA dianhydride (hexafluoroisopropylidene diphthalic anhydride) (20% mol) |
| | Oxydiphthalic anhydride (ODPA) (80% mol) |

TABLE 3-continued
| 15 | 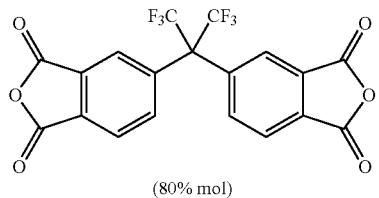 |
(80% mol)
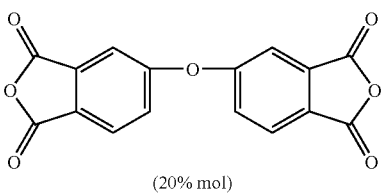
(20% mol)
| 16 | 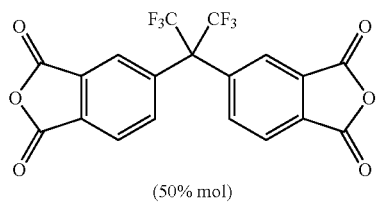 |
(50% mol)
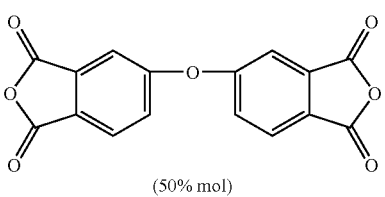
(50% mol)
| 17 | 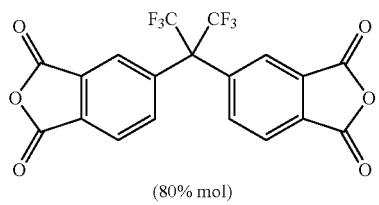 |
(80% mol)
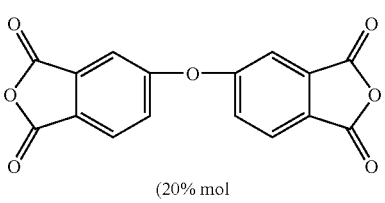
(20% mol)
| 18 | 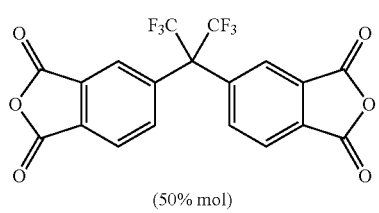 |
(50% mol)
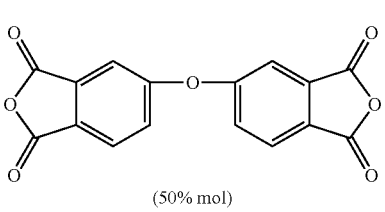
(50% mol)

TABLE 3-continued
| No. | |
|---|---|
| 19 | 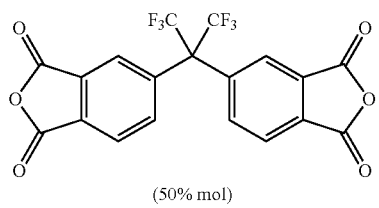 (50% mol) 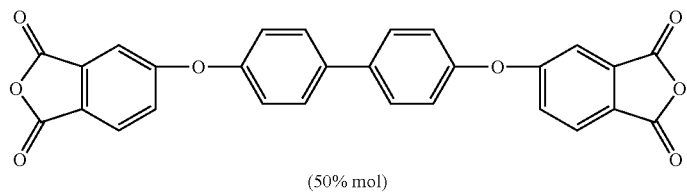 (50% mol) |
| 20 | 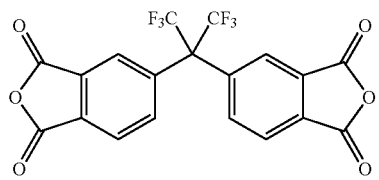 |
| 21 | 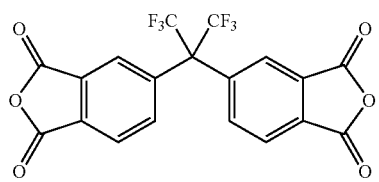 |
| 22 | 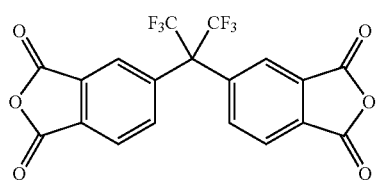 |
| 23 | 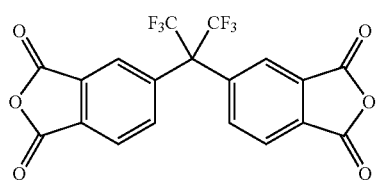 |
| No. | Diamide |
|---|---|
| 14 | 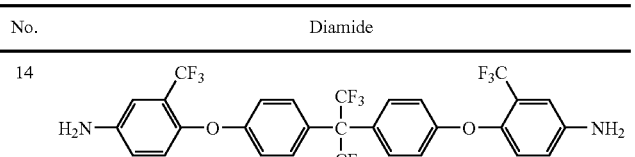 |
| 15 | 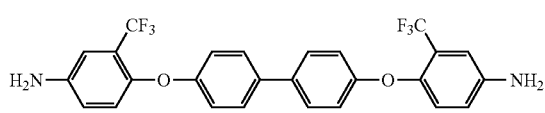 |
| 16 | 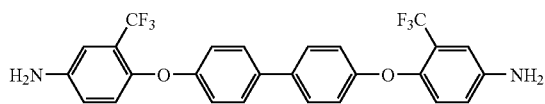 |

TABLE 3-continued

| No. | CPN$^a$ solubility | MIBK$^b$ solubility | $\Delta n^c_{633}$ | $\Delta n^d_{633}$ |
|---|---|---|---|---|
| 14 | Yes$^e$ | Yes | −0.0293 | |
| 15 | Yes | Yes | −0.0315 | −0.0514 |
| 16 | Yes | No$^f$ | −0.0392 | |

TABLE 3-continued

| | | | | |
|---|---|---|---|---|
| 17 | Yes | Yes | −0.0213 | −0.0319 |
| 18 | Yes | Yes | −0.0404 | −0.0538 |
| 19 | Yes | Yes | −0.0331 | |
| 20 | Yes[e] | Yes | −0.0336 | |
| 21 | Yes | No[f] | −0.0397 | |
| 22 | Yes | No | −0.0305 | |
| 23 | Yes | No | −0.0389 | |

[a]Cyclopentanone.
[b]Methylisobutyl ketone.
[c]Negative birefringence of 15-20 μm thick film on a glass substrate at 633 nm.
[d]Negative birefringence of 1-5 μm thick film on a triacetylcellulose (TAC) film at 633 nm.
[e]Soluble.
[f]Insoluble.

Additional examples of polymers in accordance with the present invention were made by the processes noted above, and then formed into films by the processes noted above. The results for these PAEIs is set forth in Tables 4-8. As can be seen, the films were soluble in ketones and in many instances were also soluble in toluene. Further, the films displayed negative birefringence values of greater than 0.03 and 0.04 at a thickness of less than 15 μm. The films made from poly(aryletherimides) based BTBDA and ODPA or BisADA are highly desirable because, in many cases polymers can be prepared in and cast from aromatic solvents. Still further, the BTBDA based films have a lower fluorine content, which is desirable.

TABLE 4

Combination of BisADA/BPDA/BTBDA

| | | | | Solubility | |
|---|---|---|---|---|---|
| BisADA | BPDA | BTBDA | $\Delta n_{633}$ | Toluene | MIBK |
| 100 | 0 | 100 | −0.0245 | Yes | Yes |
| 70 | 30 | 100 | −0.0304 | Yes | Yes |
| 60 | 40 | 100 | −0.0332 | Yes | Yes |
| 50 | 50 | 100 | −0.0410 | Yes | Yes |
| 40 | 60 | 100 | −0.0423 | Yes | Yes |
| 30 | 70 | 100 | −0.0413 | Yes | Yes |
| 20 | 80 | 100 | −0.0452 | No | Yes |
| 10 | 90 | 100 | −0.0588 | No | Yes |
| 5 | 95 | 100 | −0.0545 | No | Yes |
| 0 | 100 | 100 | −0.0617 | No | No |

TABLE 5

Combination of 6FDA/BPDA/BTBDA

| | | | | Solubility | |
|---|---|---|---|---|---|
| 6FDA | BPDA | BTBDA | $\Delta n_{633}$ | Toluene | MIBK |
| 100 | 0 | 100 | −0.0239 | Yes | Yes |
| 70 | 30 | 100 | −0.0338 | Yes | Yes |
| 60 | 40 | 100 | −0.0347 | Yes | Yes |
| 50 | 50 | 100 | −0.0400 | Yes | Yes |
| 40 | 60 | 100 | −0.0405 | Yes | Yes |
| 30 | 70 | 100 | −0.0524 | Yes | Yes |
| 20 | 80 | 100 | −0.0587 | Yes | Yes |
| 10 | 90 | 100 | −0.0593 | No | Yes |
| 5 | 95 | 100 | −0.0676 | No | Yes |
| 0 | 100 | 100 | −0.0794 | No | No |

TABLE 6

Combination of ODPA/BPDA/BTBDA

| | | | | Solubility | |
|---|---|---|---|---|---|
| ODPA | BPDA | BTBDA | $\Delta n_{633}$ | Toluene | MIBK |
| 100 | 0 | 100 | −0.032 | Yes | Yes |
| 50 | 50 | 100 | −0.044 | Yes | Yes |
| 20 | 80 | 100 | −0.048 | Yes | Yes |
| 10 | 90 | 100 | −0.051 | No | Yes |
| 5 | 95 | 100 | −0.053 | No | Yes |
| 0 | 100 | 100 | −0.079 | No | No |

TABLE 7

Combination of BPEDA/BPDA/BTBDA

| | | | | Solubility | |
|---|---|---|---|---|---|
| BPEDA | BPDA | BTBDA | $\Delta n_{633}$ | Toluene | MIBK |
| 100 | 0 | 100 | −0.0449 | Yes | Yes |
| 50 | 50 | 100 | | Yes | Yes |
| 30 | 70 | 100 | | Yes | Yes |
| 20 | 80 | 100 | | No | Yes |
| 10 | 90 | 100 | | No | Yes |
| 0 | 100 | 100 | −0.0794 | No | No |

TABLE 8

Combination of BisADA/BTBDA/OTOL

| | | | | Solubility | |
|---|---|---|---|---|---|
| BisADA | OTOL | BTBDA | $\Delta n_{633}$ | Toluene | MIBK |
| 100 | 0 | 100 | −0.0245 | Yes | Yes |
| 100 | 20 | 80 | −0.0287 | Yes | Yes |
| 100 | 30 | 70 | −0.0294 | No | No |

TABLE 9
BisADA/BTBDA/2<sup>nd</sup> Diamine combinations
| BTBDA | 2<sup>nd</sup> Diamide | F % (wt %) | Δn₆₃₃ | Solubility Toluene | MIBK |
|---|---|---|---|---|---|
| 80 | 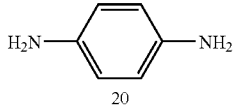 20 | 9.7 | −0.0227 | Yes | No |
| 90 | 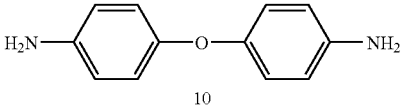 10 | 11.5 | −0.0206 | Yes | Yes |
| 90 | 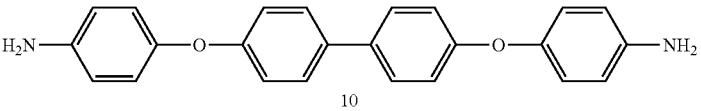 10 | 10.2 | −0.0237 | Yes | No |
| 80 | 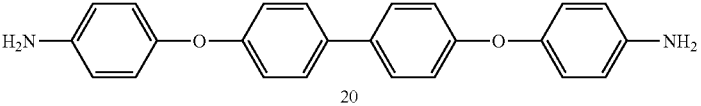 20 | 9.2 | −0.0243 | Yes | No |
| 70 | 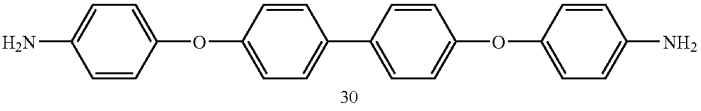 30 | 8.2 | −0.0241 | Yes | No |
| 90 | 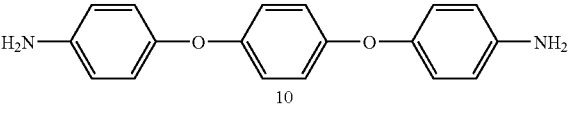 10 | 10.3 | −0.0241 | Yes | Yes |
| 80 | 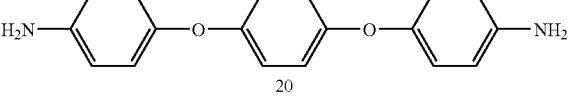 20 | 9.4 | −0.0233 | Yes | No |
| 70 | 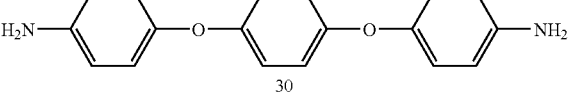 30 | 8.4 | −0.0200 | Yes | No |
| 60 | 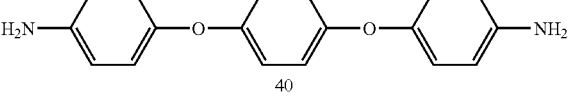 40 | 7.4 | −0.0219 | No | No |
| 90 | 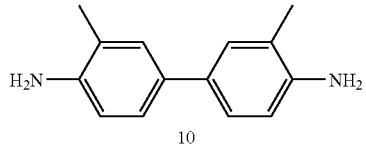 10 | 9.99 | — | Yes | Yes |
| 80 | 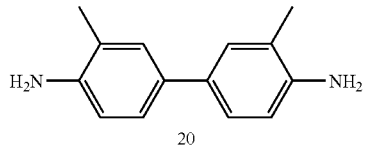 20 | 9.2 | −0.0287 | Yes | Yes |

TABLE 9-continued

BisADA/BTBDA/2nd Diamine combinations

| BTBDA | 2nd Diamide | F % (wt %) | Δn_633 | Solubility Toluene | MIBK |
|---|---|---|---|---|---|
| 70 | 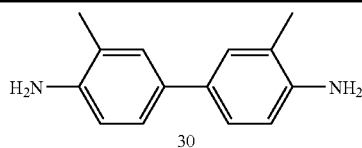 30 | 8.8 | −0.0294 | No | No |

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What we claim is:

1. A negative birefringence film prepared from a poly (aryletherimide) which is the reaction product of a dianhydride and a diamine;

where the dianhydride is 4,4'-[4,4'-(p-phenyleneoxy)isopropylidene]bis(phthalic anhydride) (BisADA),bis(3,4-dicarboxyphenyl)ether dianhydride (ODPA), 4,4'-bis(3, 4-dicarboxyphenoxy)biphenyl dianhydride (BPEDA), or 1,4-bis(3,4-dicarboxyphenyloxy)phenyl dianhydride (BPQDA), or a mixture of BisADA, ODPA, BPEDA, or BPQDA and one or more dianhydride(s) chosen from the group consisting of: 3,3',4,4'-tetracarboxylicbiphenyl dianhydride (BPDA) and 2,2-bis(3,4-dicarboxyphenyl)-1,1,1,3,3,3-hexafluoropropane dianhydride (6FDA), and where the diamine is 1,4-bis(2-trifluoromethyl-4-aminophenoxy)-2,5-di(t-butyl)benzene (BTBDA), or mixtures thereof with one or more diamine(s) chosen from the group consisting of 4,4'-diaminophenyl ether, 2-trifluoromethyl-4,4'-diaminophenyl ether, 2-trifluoromethyl-2'-methyl-4,4'-diaminophenyl ether, 1,4-bis(4-aminophenoxy)benzene, 4,4'-bis(4-aminophenoxy) biphenyl, 4,4'-bis(3-aminophenoxy)biphenyl, 4,4"-bis (4- aminophenoxy)terphenyl, 4,4'-bis(3-aminophenoxy)terphenyl, 2,2-bis[4-(4-aminophenoxy)phenyl]propane, 2,2-bis[4-(4-aminophenoxy)phenyl] 1,1,1,3,3,3-hexafluoropropane, 1,4-bis(4-amino-2-trifluoromethylphenoxy)benzene, 2,2'-bis(trifluoromethyl)-4,4'-diaminophenyl ether (6FODA), 4,4'-bis(4-amino-2-trifluoromethylphenoxy)biphenyl (6FOBDA), 4,4'-bis(4-amino-2-trifluoromethylphenoxy)-3,3',5,5'-tetramethylbiphenyl, 4,4'-bis(4-amino-2-trifluoromethylphenoxy)-3,3',5,5'-tetra(tert-butyl)biphenyl, 4,4'-bis(3-amino-trifluoromethylphenoxy)biphenyl, 4,4"-bis(4-amino-2-trifluoromethylphenoxy)terphenyl, 2,2-bis[4-(4-amino-2-trifluoromethylphenoxy)-phenyl]propane, 2,2-bis[4-(4-amino-2-trifluoromethylphenoxy)phenyl] 1,1,1,3,3,3-hexafluoropropane, 3,3'-dimethyl-4,4'-diamino biphenyl (OTOL), and 1,4-bis(2-trifluoromethyl-4-aminophenoxy)-2-t-butylbenzene, wherein when a mixture of dianhydrides is present, they are present in a molar amount of between 99 to 1 (99:1) and 1 to 99 (1:99); and the film has a negative birefringence greater than 0.01, at a thickness of less than 15 μm, when the poly(aryletherimide) is solution cast or coated onto a substrate.

2. The film of claim 1 wherein the film has one or more layers in which at least one layer is made from a poly (aryletherimide) soluble in aromatic solvents, at least one layer is a polymer substrate film, and the poly(aryletherimide) layer is solution cast or coated onto the substrate.

3. The film of claim 2 wherein at least one of the layers is a substrate layer made from triacetylcellulose.

4. The film of claim 1 wherein the poly(aryletherimide) is soluble in aromatic solvents or mixtures of aromatic solvents.

5. The film of claim 1 wherein the poly(aryletherimide) is soluble in toluene solvents, ketone solvents, and toluene or ketone solvent mixtures.

6. The film of claim 1 wherein the dianhydride is BisADA and the diamine is BTBDA.

7. The film of claim 1 wherein the dianhydride is ODPA and the diamine is BTBDA.

8. The film of claim 1 wherein the dianhydride is BPEDA and the diamine is BTBDA.

9. The film of claim 1 wherein the dianhydride is BPQDA and the diamine is BTBDA.

10. The film of claim 1 wherein the dianhydride is a mixture of ODPA and BPDA and the diamine is BTBDA.

11. The film of claim 1 wherein the dianhydride is a mixture of BisADA and BPDA and the diamine is BTBDA.

12. A liquid crystal display made using the film of claim 1.

13. A negative birefringence film prepared from a poly (aryletherimide) which is the reaction product of a dianhydride and a diamine;

where the dianhydride is a mixture of 3,3',4,4'-tetracarboxylicbiphenyl dianhydride (BPDA) and one or more of the group consisting of: 2,2-bis(3,4-dicarboxyphenyl)-1,1,1,3,3,3-hexafluoropropane dianhydride (6FDA), 4,4'-[4,4'-(p-phenyleneoxy)isopropylidene]bis (phthalic anhydride) (BisADA), bis(3,4-dicarboxyphenyl)ether dianhydride (ODPA), 4,4'-bis(3,4-dicarboxyphenoxy)biphenyl dianhydride (BPEDA), and 1,4-bis(3,4-dicarboxyphenyloxy)phenyl dianhydride (BPQDA); and where the diamine is 1,4-bis(2-trifluoromethyl-4-aminophenoxy)-2,5-di(t-butyl)benzene (BTBDA);

wherein the mixture of dianhydrides is present in a molar amount of between 99 to 1 (99:1) and 1 to 99 (1:99); and the film has a negative birefringence greater than 0.01, at a thickness of less than 15 μm, when the poly(aryletherimide) is solution cast or coated onto a substrate.

14. The film of claim 13 wherein the film has one or more layers in which at least one layer is made from a poly(aryletherimide) soluble in aromatic solvents, at least one layer is a polymer substrate film, and the poly(aryletherimide) layer is solution cast or coated onto the substrate.

15. The film of claim 13 wherein the poly(aryletherimide) is soluble in aromatic solvents or mixtures of aromatic solvents.

16. A liquid crystal display made using the film of claim 13.

* * * * *